Dec. 30, 1924.
A. L. FUNK
BRAKE MECHANISM
Filed May 2, 1923
1,520,941
2 Sheets-Sheet 1
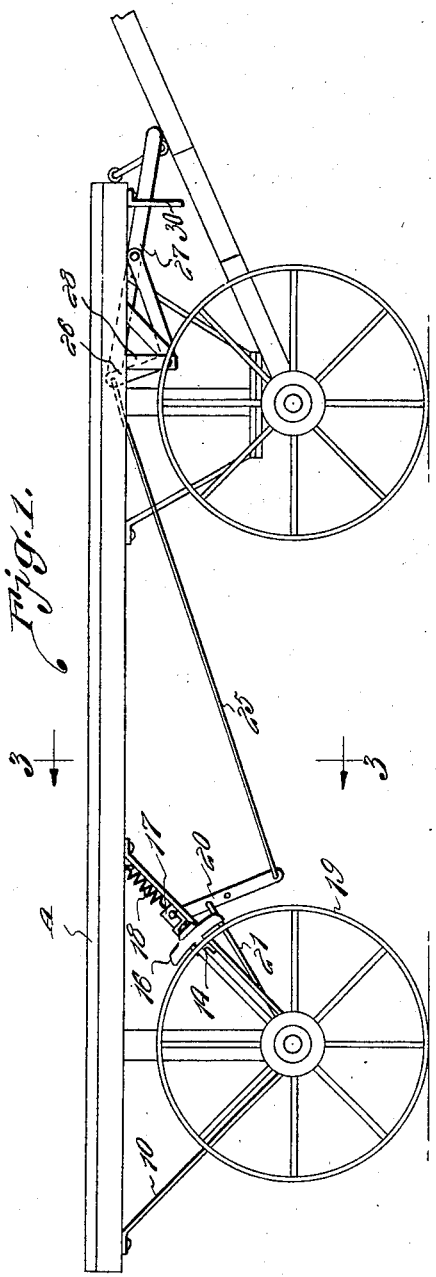
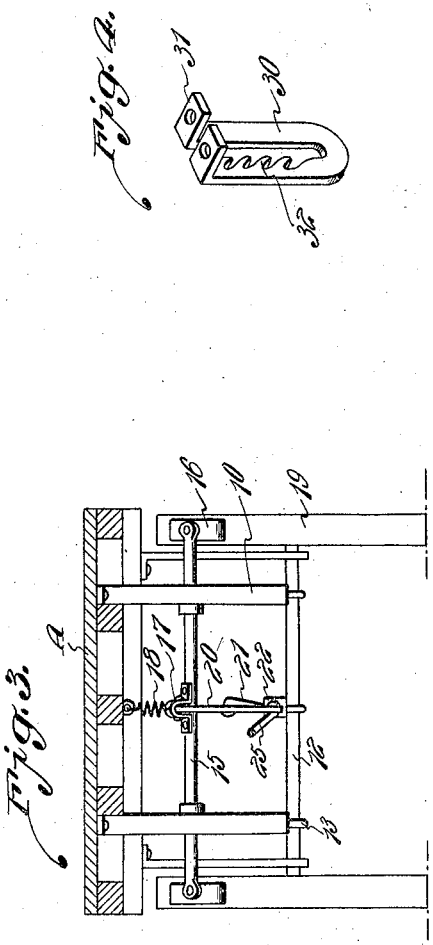
A. L. Funk
INVENTOR
BY Victor J. Evans
ATTORNEY
WITNESS:

Dec. 30, 1924.
A. L. FUNK
1,520,941
BRAKE MECHANISM
Filed May 2, 1923     2 Sheets-Sheet 2
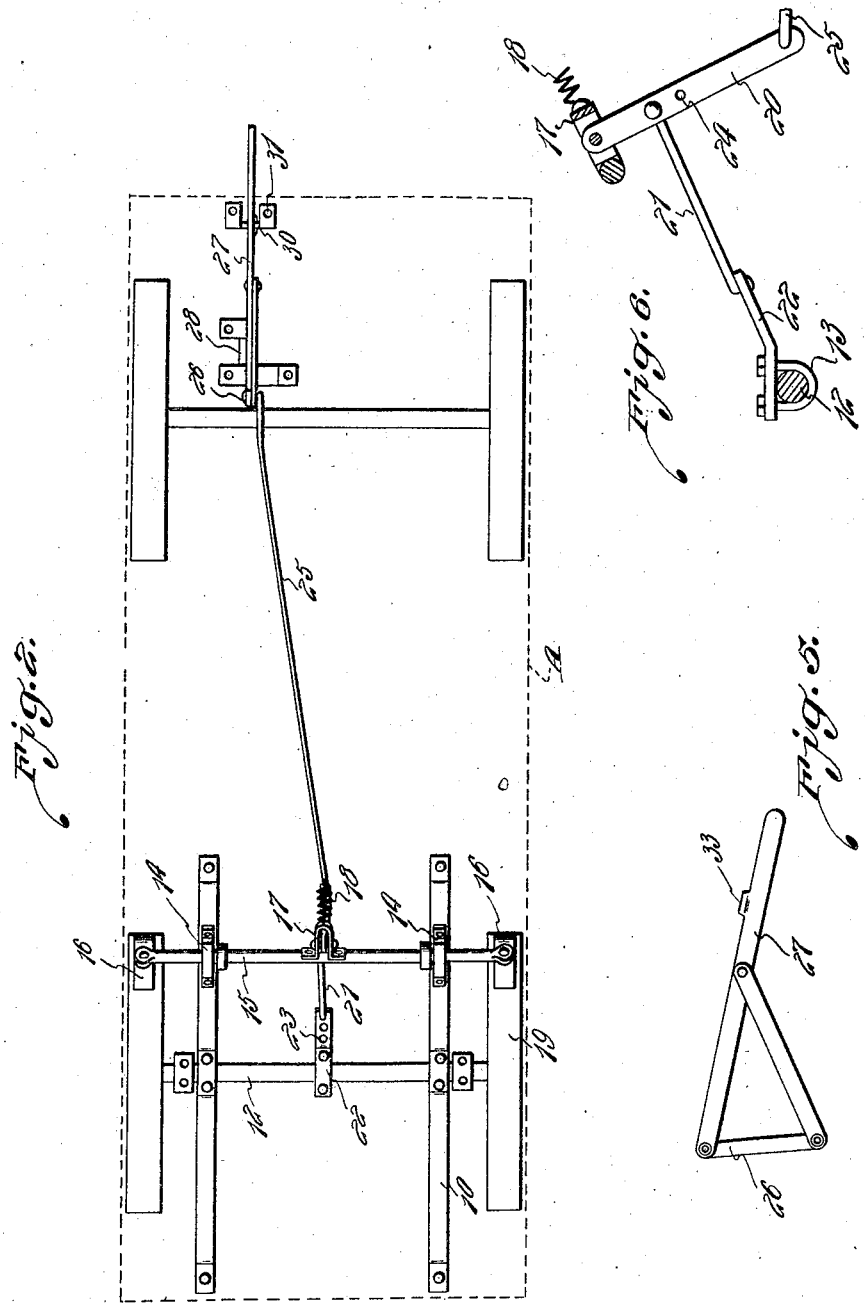

Patented Dec. 30, 1924.

1,520,941

UNITED STATES PATENT OFFICE.

AUSTIN L. FUNK, OF LONGFORD, KANSAS.

BRAKE MECHANISM.

Application filed May 2, 1923. Serial No. 636,189.

*To all whom it may concern:*

Be it known that I, AUSTIN L. FUNK, a citizen of the United States, residing at Longford, in the county of Clay and State of Kansas, have invented new and useful Improvements in Brake Mechanism, of which the following is a specification.

This invention relates to a brake mechanism, and contemplates a structure primarily intended for use upon baggage trucks of the type generally employed about railroad stations, so that such trucks can be conveniently held against movement when desired.

The nature and the advantages of the invention will be better understood when the following detail description is read in connection with the accompanying drawings, the invention residing in the construction, combination and arrangement of parts as claimed.

In the drawings forming part of this application, the like numerals of reference indicate similar parts in the several views, and wherein:

Figure 1 is a side elevation of a truck equipped with the brake mechanism forming the subject matter of the present invention.

Figure 2 is a bottom plan view of a truck equipped with said mechanism.

Figure 3 is a sectional view taken on line 3—3 of Figure 1 looking in the direction of the arrows.

Figure 4 is a detail view of the toothed bracket.

Figure 5 is a detail view of the hand operated lever.

Figure 6 is a detail view showing a connection between the brake operating lever and the axle.

Referring to the drawings in detail, 10 indicates a pair of V-shaped elements, each having its terminals secured to the underside of the body of the truck represented generally at A, and its intermediate portion shaped to conform to the curvature of the axle 12 upon which it reposes. These elements are held associated with the axle 12 by U-bolts 13, which straddle the axle and suitably secured to the elements as shown in Figure 3. Supported by one limb of each V-shaped element is a substantially U-shaped guide 14, and movable in these guides is the brake rod 15, the terminals of which support the brake shoes represented at 16. Carried by this rod 15 at an appropriate point in its plane is a bracket 17 to which is secured one end of a coil spring 18, the other end of which is secured to the other side of the body of the truck, so that the spring operates and normally holds the brake shoes 16 spaced from the periphery of the adjacent wheel 19. This bracket 17 is also secured to the adjacent end of the brake lever 20, which lever depends from the bracket 17 and from the rod 15. This brake is fulcrumed upon a rod 21 which projects upwardly and forwardly from the bracket 22 secured to the rear axle as illustrated in Figure 2. This bracket is provided with a plurality of openings 23 so that an adjustment can be made between the bracket and the rod 21. The lever 20 is also provided with spaced openings 24 so that an adjustment may be made between this lever and the adjacent end of the rod 21.

The lever 20 may be actuated in any suitable manner in order to apply the brake shoes 16 to the wheel of the truck, and for this purpose, I preferably make use of a reciprocating rod 25 arranged beneath the truck and having one end connected with the lower end of the lever 20. The other end of this rod 25 is connected with the offset extremity 26 of a manually operable lever 27, the latter being fulcrumed on a suitable bracket 28 depending from the body of the truck as shown in Figure 1. The lever 27 extends forwardly in advance of the body of the truck where it can be conveniently grasped and operated to control the brake, and this lever 27 is moved vertically in a substantially U-shaped bracket of the construction shown in Figure 4. This bracket is indicated at 30 and has its terminals offset at 31 so that the bracket can be conveniently secured to the underside of the truck, the lever 27 moving in the space between the limbs of the bracket as is obvious. One limb of this bracket is provided with teeth 32 which cooperates with a lug 33 carried by the lever 27 to hold the lever in an adjusted position and the brakes applied. The mechanism can be easily and conveniently operated, and is very efficient for the purpose intended.

While it is believed that from the foregoing description, the nature and advantages of the invention will be readily understood, I desire to have it known that I do not limit myself to what is herein shown and described, and that such changes may be resorted to when desired as fall within the scope of what is claimed.

What is claimed is:—

1. A brake mechanism for trucks comprising a bar arranged transversely beneath the truck body, brake shoes carried by the ends of said bar, yieldable means for normally holding the shoes spaced from the adjacent wheels, means for moving said shoes to active position, and including a manually operable rod extended toward the forward end of the truck, a lever pivoted to the rear end of said rod, said lever being pivotally connected with said bar, and an adjustable connection between the lever and the rear axle of the truck to permit of an adjustment of said shoes with relation to the wheels.

2. A brake mechanism for trucks of the character described comprising a transverse bar arranged beneath the truck body, brake shoes carried by the ends of said bar, a bracket supported by said bar yieldable means connected with the bracket for normally holding the bar and shoes elevated, a lever pivoted on said bracket and depending therefrom, a bracket mounted on the rear axle of the truck and including an apertured portion projecting forwardly therefrom, a link providing an adjustable connection between said apertured portion of the bracket and said lever, a reciprocatory rod connected with the lower end of said lever and projecting toward the forward end of the truck, a manually operable lever connected with said rod for moving the brake shoes to contact with the wheels of the truck to apply the brakes, and means for holding the manually operable lever in its active position.

In testimony whereof I affix my signature.

AUSTIN L. FUNK.